United States Patent Office 2,881,218
Patented Apr. 7, 1959

2,881,218
4-CHLORO-5,7-DIHYDROXY-2-METHYL-1-INDANONE

Donald G. Kundiger, Manhattan, Kans., and Elwin B. W. Ovist, Park Forest, Ill., assignors to The Dow Chemical Company, Midland, Mich., a corporation of Delaware No Drawing. Application August 6, 1956
Serial No. 602,413

1 Claim. (Cl. 260—590)

This invention is concerned with dihydroxy-methyl-indanones and is particularly directed to compounds having the formula

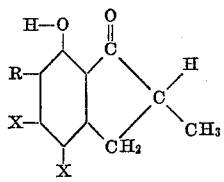

wherein one X is hydroxyl and the other X is hydrogen, chlorine or a methyl radical, and R is hydrogen or methyl.

The new compounds are crystalline solids somewhat soluble in many organic solvents and in aqueous alkaline solutions and having limited solubility in water. They have been found useful as intermediates for the production of more complex organic derivatives and as active antimicrobial agents for the control of various bacterial and fungal organisms.

In the preparation of the compounds of the invention one molar proportion of a diester having the formula

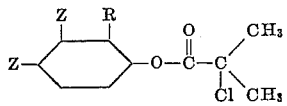

wherein one Z represents an α-chloro-isobutyryloxy radical and the other Z represents hydrogen, chlorine or a methyl radical and R has the aforementioned significance, is blended with at least 4 molar proportions of anhydrous aluminum chloride and heated at a reaction temperature for a period of time to produce the desired product. On completion of the reaction, the dihydroxyindanone product is recovered by decomposing aluminum complexes in the crude reaction product with a strong mineral acid, followed by conventional procedures such as extraction with solvents and recrystallization.

In carrying out the reaction, the diester and anhydrous aluminum chloride are mixed together and heated at a temperature of from about 80° to 200° C. for a period of from about 15 minutes to several hours. The reaction proceeds with the evolution of hydrogen chloride and at a rate increasing with increasing temperatures. The time required for the reaction is dependent upon the particular temperature employed and on the nature of the substituents on the benzene ring of the diester starting material.

In general, the reaction is carried out with the diester and aluminum chloride as the sole ingredients of the reaction mixture. However, if desired, small amounts of inert solvents can be employed. Further, the reaction can conveniently be carried out in the presence of the dihydroxy benzene compound corresponding to the diester employed.

The diester starting materials employed in the present invention may be prepared in any suitable fashion. A preferred method for the preparation of such diester compounds is disclosed and claimed in our copending application, Serial No. 602,414, filed concurrently herewith.

The following examples illustrate the invention but are not to be construed as limiting the same.

Example 1

89 grams (0.28 mole) of hydroquinone bis(α-chloroisobutyrate) and 129.9 grams (0.97 mole) of anhydrous aluminum chloride were thoroughly mixed at room temperature and the resulting mixture heated rapidly to 100° C. to initiate reaction and thereafter maintained at temperatures of from 110° to 125° C. for a period of 1 hour. The crude reaction product was poured into a mixture of ice and hydrochloric acid to decompose aluminum complexes. The resulting dispersion was extracted successively with three 300-milliliter portions of diethyl ether. The ether extracts were combined and extracted with aqueous 10 percent by weight sodium hydroxide solution to obtain a strongly alkaline, aqueous extract. The latter was acidified and extracted with ether. The final ether extract was distilled to recover the solvent and obtain as a residue a 4,7-dihydroxy-2-methyl-1-indanone product. This product was recrystallized from water to prepare a purified product melting at 175°–177° C. and containing 67.5 percent by weight of carbon and 5.5 percent by weight of hydrogen by analysis, as compared to theoretical values of 67.5 and 5.6 percent, respectively, calculated for 4,7-dihydroxy-2-methyl-1-indanone.

Example 2

53.3 grams (0.4 mole) of anhydrous aluminum chloride was added portionwise with stirring to a mixture of 35.4 grams (0.1 mole) of 4-chlororesorcinol bis(α-chloroisobutyrate) and 14.5 grams (0.1 mole) of 4-chloro-resorcinol. The resulting mixture was heated to 85°–110° C. for one hour. The crude product was poured into a mixture of ice and hydrochloric acid, worked up as in Example 1 and distilled under vacuum to obtain a 4-chloro-5,7-dihydroxy-2-methyl-1-indanone product, boiling at 148°–156° C. under 0.2 millimeter pressure. The latter was recrystallized from a mixture of ethanol and water to prepare a purified 4-chloro-5,7-dihydroxy-2-methyl-1-indanone as a crystalline solid melting at 186°–186.5° C.

Example 3

68 grams (0.2 mole) of resorcinol bis(α-chloroisobutyrate) and 100 grams (0.85 mole) of anhydrous aluminum chloride were mixed together and heated at temperatures of from 80°–95° C. for 95 minutes and at 95°–115° C. for 15 minutes. The crude reaction product was poured into a mixture of ice and hydrochloric acid and the resulting dispersion extracted with ether as in Example 1. The combined ether extracts were extracted with aqueous 10 percent sodium hydroxide solution and the aqueous alkaline extract separated and acidified to precipitate a 5,7-dihydroxy-2-methyl-1-indanone product as a crystalline solid melting at 152° C. This product was found to contain 67.5 percent by weight of carbon and 5.43 percent by weight of hydrogen as compared with theoretical values of 67.5 and 5.6 percent, respectively.

Example 4

106 grams (0.2 mole) of 2-methyl-hydroquinone bis-(α-chloro-isobutyrate) and 169 grams (1.3 moles) of anhydrous aluminum chloride were thoroughly mixed and heated at temperatures of from 100° to 125° C. for 20 minutes and at 180°–195° C. for 10 minutes. Thereafter, the crude reaction product was worked up as in Example 3 to obtain a 4,7-dihydroxy-2,5-dimethyl-1-indanone as a crystalline solid melting at 124°–125° C. This product was found to contain 68.77 percent by weight of carbon and 6.29 percent by weight of hydrogen by analysis as compared to theoretical values of 68.8 and 6.25 percent, respectively, calculated for the above dihydroxy dimethylindanone.

In a similar fashion, 2-methylresorcinol bis(α-chloroisobutyrate), 4-methylresorcinol bis(α-chloroisobutyrate) and 2,4-dimethylresorcinol bis(α-chloroisobutyrate) are heated with anhydrous aluminum chloride to produce 5,7-dihydroxy-2,6-dimethyl-1-indanone, 5,7-dihydroxy-2,4-dimethyl-1-indanone and 5,7-dihydroxy-2,4,6-trimethyl-1-indanone, respectively.

In representative parasiticidal operations, 4-chloro-5,7-dihydroxy-2-methyl-1-indanone and 4,7-dihydroxy-2-methyl-1-indanone were dispersed in nutrient agar media to produce series of media saturated with respect to one of the indanone compounds. The media so prepared were streaked with active cultures of *Salmonella typhosa*, *Staphylococcus aureus* and *Rhizopus nigricans* and thereafter incubated for 24 to 48 hours at a temperature conducive to the growth of the organism concerned. It was found that each of the compounds completely inhibited growth of each of the test organisms.

We claim:

4-chloro-5,7-dihydroxy-2-methyl-1-indanone.

References Cited in the file of this patent

Mayer et al.: Ber. Deut. Chem., vol. 61, pp. 1972–3 (1928).

Bruce et al.: J. Chem. Soc. (London), 1953, pp. 2403–6.